No. 719,189. PATENTED JAN. 27, 1903.
H. D. CLAYTON.
DEVICE FOR CUTTING WEEDS AND STIRRING SOIL.
APPLICATION FILED AUG. 16, 1902.
NO MODEL. 3 SHEETS—SHEET 1.
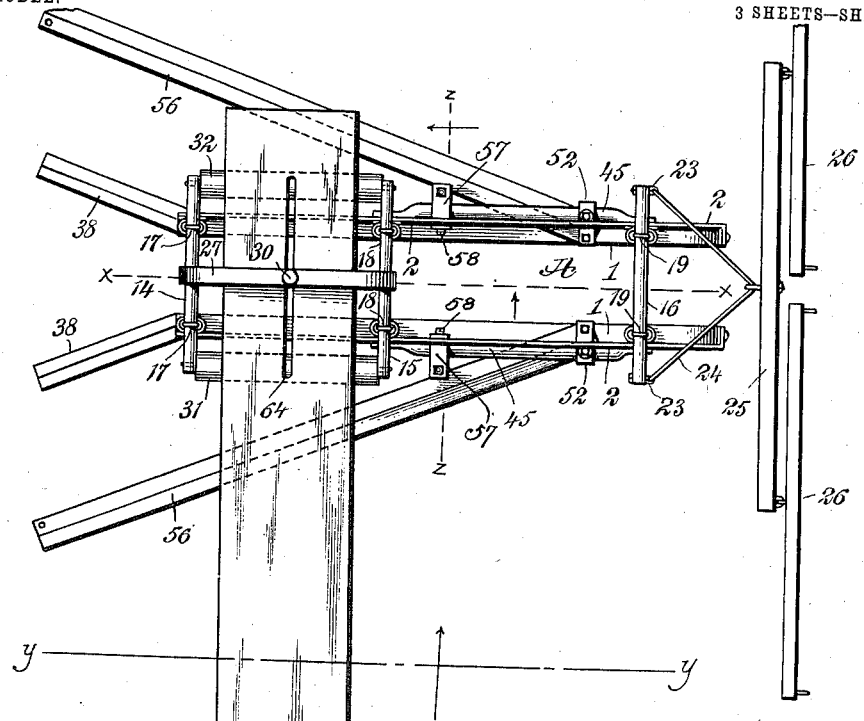
Fig. 1.
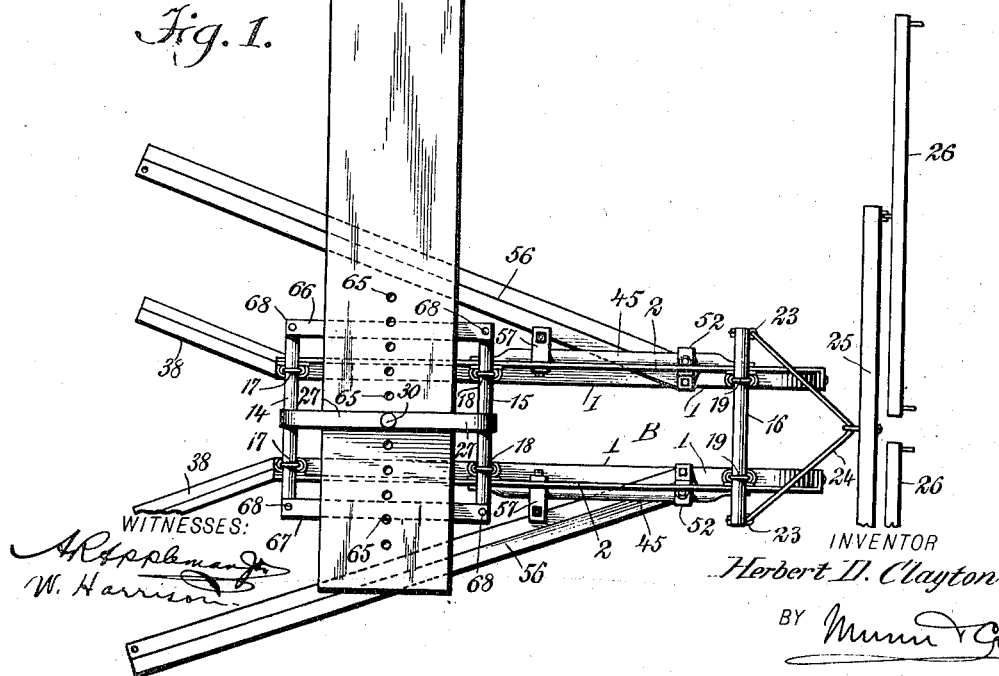
WITNESSES:
A. R. Appleman
W. Harrison
INVENTOR
Herbert D. Clayton
BY Munn & Co
ATTORNEYS.

No. 719,189. PATENTED JAN. 27, 1903.
H. D. CLAYTON.
DEVICE FOR CUTTING WEEDS AND STIRRING SOIL.
APPLICATION FILED AUG. 16, 1902.
NO MODEL. 3 SHEETS—SHEET 2.
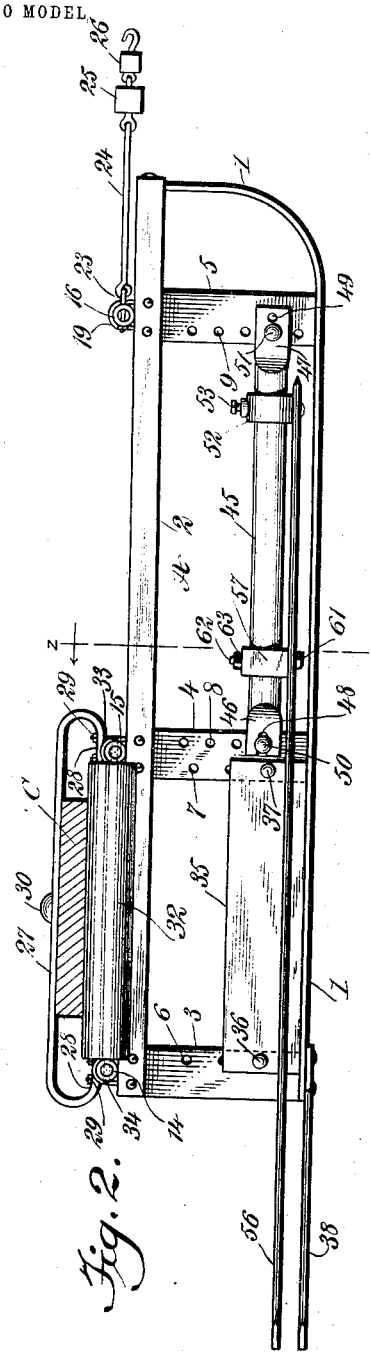
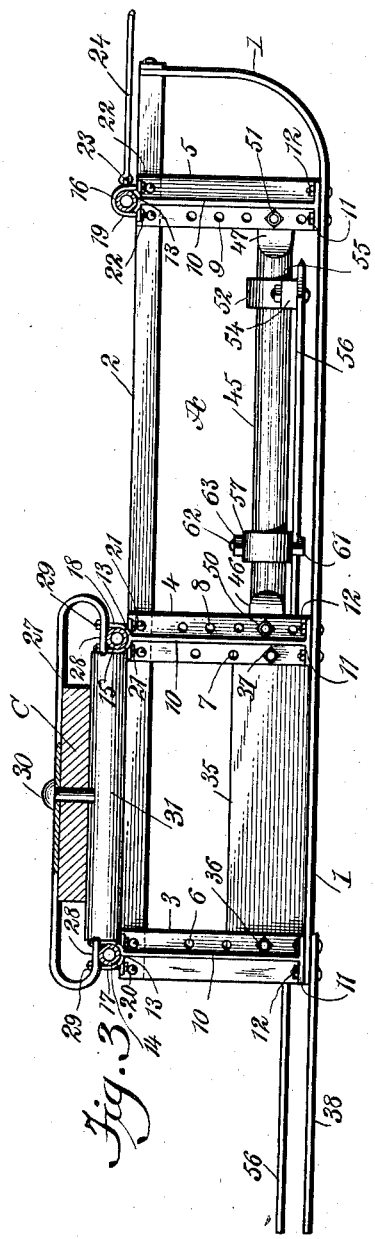
WITNESSES:
INVENTOR
Herbert D. Clayton
BY
ATTORNEYS.

No. 719,189. PATENTED JAN. 27, 1903.
H. D. CLAYTON.
DEVICE FOR CUTTING WEEDS AND STIRRING SOIL.
APPLICATION FILED AUG. 16, 1902.
NO MODEL. 3 SHEETS—SHEET 3.
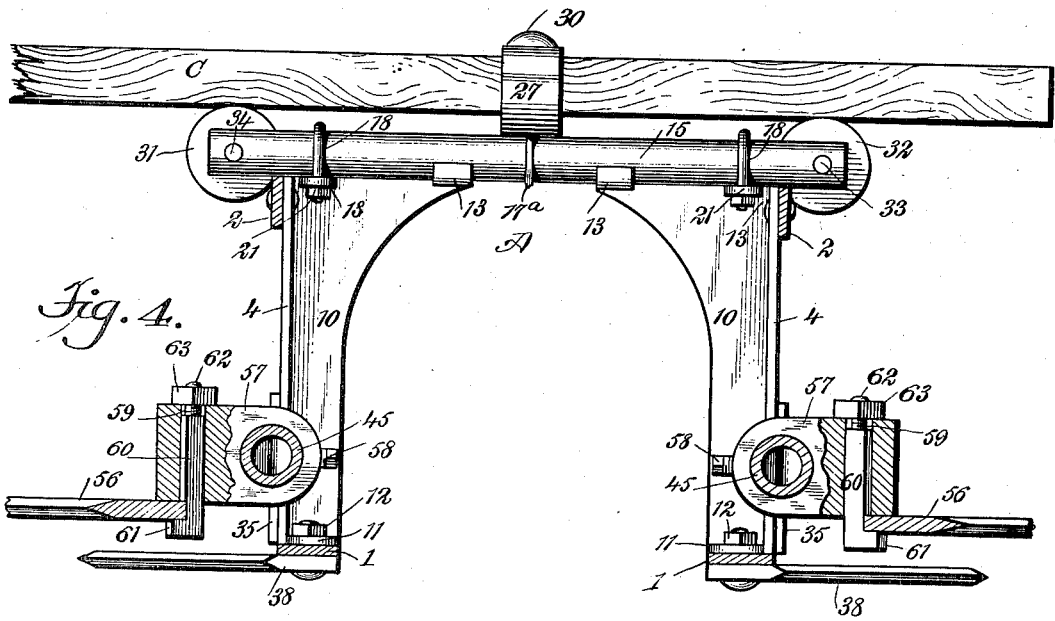
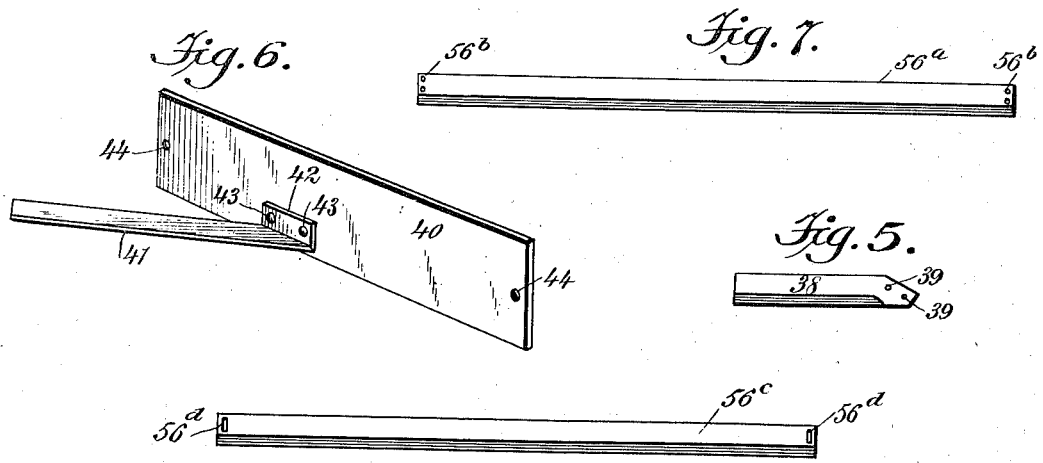
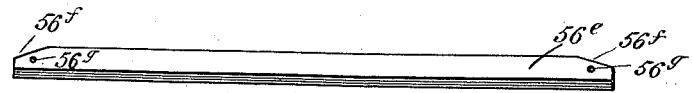
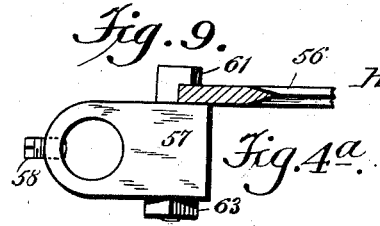
WITNESSES:
A. R. Appleman
Walton Harrison
INVENTOR
Herbert D. Clayton
BY Munn & Co
ATTORNEYS.

UNITED STATES PATENT OFFICE.

HERBERT D. CLAYTON, OF EDMOND, KANSAS.

DEVICE FOR CUTTING WEEDS AND STIRRING SOIL.

SPECIFICATION forming part of Letters Patent No. 719,189, dated January 27, 1903.

Application filed August 16, 1902. Serial No. 119,876. (No model.)

*To all whom it may concern:*

Be it known that I, HERBERT D. CLAYTON, a citizen of the United States, and a resident of Edmond, in the county of Norton and State of Kansas, have invented new and useful Improvements in Devices for Cutting Weeds and Stirring Soil, of which the following is a full, clear, and exact description.

My invention relates to an agricultural implement used for cutting weeds and stirring soil, and more particularly used in crops planted with a lister.

The machine consists, essentially, of a pair of sleds connected together by means of a long board, the sleds being preferably pulled by four horses, and is provided with cutting mechanism for severing weeds and for pulverizing the surface of the soil.

My invention includes divers adjustments of the parts and also several improvements in structure, as hereinafter pointed out.

Reference is to be had to the accompanying drawings, forming a part of this specification, in which similar characters of reference indicate corresponding parts in all the figures.

Figure 1 is a fragmentary plan view showing my device ready for use. Fig. 2 is a vertical section upon the line $x\ x$ of Fig. 1 looking in the direction of the arrow. Fig. 3 is a somewhat similar section taken upon the line $y\ y$ of Fig. 1 looking in the direction of the arrow. Fig. 4 is an enlarged vertical cross-section upon the line $z\ z$ of Fig. 1 looking in the direction of the arrow. Fig. 4$^a$ is a detail view showing one of the brackets and its accompanying parts disposed in an abnormal relation. Fig. 5 is a plan view of one of the so-called "short" knives. Fig. 6 is a perspective view of a side board having a modified form of knives secured thereto; and Figs. 7, 8, and 9 are plan views of respective modified forms of one of the so-called "long" knives.

The sleds are shown at A and B and the board for connecting the same is shown at C. The runners 1 are surmounted by rails 2, connected therewith by means of the posts 3 4 5, these posts being provided with adjustment-holes 6, 7, 8, and 9. Each post is provided with a rib 10 and with a foot 11, which rests upon the runner and is secured thereto by means of bolts 12. Each rib 10 terminates at its upper end in a bearing 13. These bearings directly engage the tubular cross-bars 14 15 16 and are rigidly held against the same by means of U-shaped clamps 17 18 19, as shown more particularly in Figs. 2 and 3. These U-shaped clamps are detachably held in place by means of nuts 20 21 22. By loosening these nuts the clamps may be moved longitudinally upon the tubular bars, and the runners 1 may thus be spaced asunder to any desired extent or adjusted relatively to each other. Each sled may therefore be rendered wide or narrow, as desired.

Fastenings 23 are secured upon the cross-bar 16, and to these fastenings are secured longitudinal clevises 24, upon which are mounted the doubletrees 25, these doubletrees in turn supporting the singletrees 26, whereby the horses are harnessed to the machine. Resilient yokes 27, made, preferably, of spring metal, are provided for engaging the ends of the boards C. These yokes terminate in bearing-plates 28, which are adjustably secured to the tubular rods 14 15 by means of the U-shaped clamps 17$^a$. By loosening these clamps the relative position of each yoke 27 may be changed relatively to the tubular rods upon which it rests. Nuts 29 are used for tightening these clamps. Bolts 30 pass centrally through the yokes 27 and also through the board C, as indicated more particularly in Fig. 1.

A pair of rollers 31 32, provided with journals 33 34, are mounted between the tubular rods 14 15 and are free to turn at all times. These rollers are for the purpose of allowing the board C to travel longitudinally within certain limits, thereby enabling the sleds to approach and recede from each other to a certain extent. By this means as the sleds are dragged across the fields they can conform to the surface of the ground and to the varying width and distance apart of different rows.

Each sled is provided with vertical side boards 35, which are held in place and rendered adjustable by means of bolts 36 37, these bolts engaging the holes 6 7 in the posts 3 4, as shown more particularly in Figs. 2 and 3. The purpose of these side boards is to prevent the entrance of dirt loosened by the cutting mechanism, which would otherwise have a tendency to enter the space between the runners. Sometimes, however, it is desirable to admit more or less dirt into this space and between the posts 3 and 4. When this is the case, the boards 35 may be raised to any desired extent by removing the bolts 36 37 and placing the same through either of the holes.

Short knives 38, provided with rivet-holes 39, are secured beneath the runners 1 and are situated in a low plane relatively to the bottom of the machine. Instead of the side boards 35 a modified form of boards 40 may be employed. The modification consists of knives 41, each provided with a flange 42, through which extend holes 43, whereby the knives are riveted upon the boards 40. Where knives 41 are secured upon the board 40, the knives 38 are not employed. In other words, the knives 41 are merely substituted for the knives 38. In instances where it is desirable to have knives secured directly upon the side boards the holes 44 in the boards 40 are engaged by the bolts 36 37 in like manner as when the boards 35 are used.

Longitudinal tubular rods 45 are provided for the purpose of supporting certain of the cutting mechanism and rendering the same adjustable. Each rod 45 is provided with flattened ends 46 47, one end being provided with a slot 48, the other with a plurality of adjustment-holes 49. Bolts 50 51 engage the slot 48 and the adjustment-holes 49, respectively, and also engage the holes 8 9 in the posts 4 5.

Brackets 52, provided with screw-bolts 53 and with flattened portions 54, are mounted upon the rods 45 and are provided with bolts 55, whereby the long knives 56 may be secured thereto. The brackets 57 are somewhat similar to the brackets 52 and are provided with set-screws 58, whereby said brackets are adjustably mounted upon the rods 45. Each bracket 57 is provided with an angular aperture 59, and through this aperture a bolt 60, provided with a lug 61 and with a screw portion 62, passes, the screw portion 62 being engaged by an angular nut 63, whereby the bolt 60 may be adjusted relatively to the bracket. The lug 61 engages the back of the knife 56.

If desired, a long knife 56ª, provided at each of its ends with two holes 56ᵇ, may be employed, as indicated in Fig. 5, or, if desired, the knife may have the form 56ᶜ, provided at its ends with slots 56ᵈ, as indicated in Fig. 8. A knife 56ᵉ may be provided with beveled ends 56ᶠ and with bolt-holes 56ᵍ, as indicated in Fig. 9. The purpose in having fastenings 56ᵇ, 56ᵈ, 56ᶠ, and 56ᵍ upon both ends of the knife is to render the same reversible, so that after the edge of the knife adjacent to one of its ends has become considerably worn the knife may be reversed by placing it upon the other side of the machine, so that a different portion of the edge is exposed to the hardest usage.

As indicated in Fig. 4ª, the brackets 57 may be interchanged, so that the knives 56 will occupy comparatively high planes, as is sometimes desirable in deep listing.

The long knives 56 are capable of several adjustments. By adjusting the height of the bars 45, which is done by moving the bolts 50 into the holes 8 9 of different altitudes, the knives 56 may be placed upon any desired relative plane. By removing the bolt 51 from one of the holes 49 and inserting the same through another hole, meanwhile transposing the bar 45, so that the bolt 50 occupies a different portion of the slot 48, the knives 56 may be adjusted slightly as regards the general length of the sleds. By moving the brackets 52 and 57 or either of them the general angles of the knives 56 may be changed—that is to say, the knives may be rendered more or less divergent at will. This may be seen to better advantage by inspecting the sled A. (Shown at the right hand in Fig. 1.) It is clear that by moving the brackets 57 forward or backward or by moving the brackets 52 relatively with the brackets 57 the knives 56 may be placed at any number of different relative angles.

The board C is provided with a slot 64 and with adjustment-holes 65, as indicated more clearly in Fig. 1. Upon the sled A is mounted a rest consisting of the beams 66 67, rigidly connected by bolts 68 with the cross members 14 15. The board C is connected at each of its ends with a sled A B, the left-hand end of the board being so disposed that the slot 64 is engaged by the bolt 30. The other end of the board rests upon the beams 66 67, the bolt 30 passing through one of the holes 65. The arrangement is such that the end of the board resting upon the beams 66 67 is held comparatively rigid, whereas the opposite end is free to roll upon the rollers 31 32, the slot 64 permitting this movement within certain limits.

The general operation of my device is as follows: Any desired adjustments having been made, as above described, the horses are hitched in the usual manner to the singletrees 26 and the driver takes his seat in the center of the board C. The machine is now dragged forward by the horses. The sleds are free to move asunder and toward each other within reasonable limits, thus conforming to the nature of the ground, the shape and size of the rows, &c.

Having thus described my invention, I claim as new and desire to secure by Letters Patent—

1. A device for cutting weeds and stirring soil, comprising a plurality of sleds provided with runners and with rails, posts connecting said runners with said rails, bars mounted upon said posts, means controllable at will for adjusting said bars relatively to said posts, brackets adjustably mounted upon said bars, knives each having one end pivotally connected with one bracket and engaging another bracket intermediate of its ends, and means for dragging said sleds.

2. A device for cutting weeds and stirring soil, comprising a plurality of sleds provided with runners and with rails, posts connecting said runners with said rails, bars mounted upon said posts, brackets mounted upon said bars, means controllable at will for adjusting said brackets relatively to said bars, knives each having one end pivoted to one bracket and locked to another bracket intermediate of its ends, and means for dragging said sleds.

3. A device for cutting weeds and stirring soil, comprising a plurality of sleds provided with runners and with rails, posts connecting said runners with said rails, bars mounted upon said posts, two brackets mounted upon each bar and adjustable relatively to each other, one of said brackets being provided with lugs, longitudinal knives pivoted to the forward brackets and engaged by the lugs of the rear brackets, the arrangement being such that said knives are adjustable to different angles by changing the position of said brackets relatively to each other, and means for dragging said sleds.

4. A device for cutting weeds and stirring soil, comprising a plurality of sleds provided with runners and with rails, posts connecting said runners with said rails and spacing the same apart, and longitudinal knives mounted with their front ends inserted in said openings and their rear ends diverging outwardly and rearwardly, whereby the cutting edges of said knives extend from planes coincident with said rails and said runners, and means for dragging said sleds.

5. A device for cutting weeds and stirring soil, comprising a pair of sleds, each provided with cutting mechanism, rollers mounted upon one of said sleds, a rest mounted upon the other of said sleds and immovable relatively thereto, and a longitudinal member engaging said rest and resting upon the said rollers, and resilient yokes carried by the sleds and engaging the said member, thereby flexibly connecting said sleds together and providing for lateral movements of the same relatively to each other.

6. A device for cutting weeds and stirring soil, comprising a plurality of sleds, each provided with cutting mechanism and with posts, side boards engaging said posts, and means controllable at will for adjusting said side boards relatively to said posts, whereby more or less dirt actuated by said cutting mechanism may pass beneath said side boards if desired.

7. A device for cutting weeds and stirring soil, comprising a plurality of sleds, each provided with knives and with posts, side boards connected with said posts and adjustable relatively thereto, additional knives rigidly mounted upon said side boards, and means for dragging said sleds.

8. A device for cutting weeds and stirring soil, comprising sleds provided with runners and with rails, posts connecting said runners and said rails, said posts being provided with bearings at their upper ends, cross-bars engaging said bearings, clamps detachably engaging said bearings and said cross-bars, whereby said posts are adjustable relatively to said cross-bars, side boards adjustably secured to the posts and cutting mechanism connected with said boards.

9. In a device for cutting weeds and stirring the soil, the combination with two sleds, each provided with spaced cross-bars, of resilient yokes each having their ends adjustably secured to the cross-bars of a sled, and a board having its ends adjustably secured to said yokes, as set forth.

10. A device for cutting weeds and stirring the soil, comprising two sleds each having their runners adjustable toward and from each other, a board having its ends adjustably and yieldingly connected with the sleds, and cutters secured to the rear and to the sides of each of the said sleds, as set forth.

In testimony whereof I have signed my name to this specification in the presence of two subscribing witnesses.

HERBERT D. CLAYTON.

Witnesses:
   J. A. BROWN,
   L. DEAN.